United States Patent [19]
Everett

[11] Patent Number: 6,050,581
[45] Date of Patent: Apr. 18, 2000

[54] BICYCLE TRAILER HITCH ASSEMBLY

[76] Inventor: Richard C. Everett, 225 Sunshine La., West Linn, Oreg. 97068

[21] Appl. No.: 09/072,474

[22] Filed: May 4, 1998

[51] Int. Cl.⁷ .................................................. B62K 27/12
[52] U.S. Cl. .......................... 280/204; 280/295; 280/495
[58] Field of Search ................................... 280/204, 202, 280/288.4, 292, 293, 295, 304, 304.5, 495; 224/426, 425, 419, 422, 429, 447, 449, 450

[56] References Cited

U.S. PATENT DOCUMENTS

| 661,145 | 11/1900 | Hausmann . | |
|---|---|---|---|
| 3,347,559 | 10/1967 | Robinson | 280/204 |
| 4,261,592 | 4/1981 | Buesseuil | 280/292 |
| 4,413,692 | 11/1983 | Clifft | 280/204 |
| 4,721,320 | 1/1988 | Creps et al. | 280/204 |
| 5,242,178 | 9/1993 | Galasso et al. | 280/292 |
| 5,669,618 | 9/1997 | Chiu | 280/204 |

FOREIGN PATENT DOCUMENTS

| 589480 | 3/1994 | European Pat. Off. | 280/204 |

Primary Examiner—Anne Marie Boehler
Attorney, Agent, or Firm—Edward E. Roberts

[57] ABSTRACT

A bicycle trailer hitch assembly including first and second hitch members configured as mirror images of one another, the hitch members being adapted and arranged for attachment to opposites sides of the bicycle frame adjacent the rear wheel. Each member includes a body portion having a first projection configured for abutting relation with the chain stay of the bicycle and a second arcuately configured projection for tangentially abutting relation with the seat stay, each of the projections having a fastener arrangement coacting with the body portion and the adjacent stay of the bicycle frame for enabling securing the hitch member to the frame. Both projections extend from the same side of the body portion with the opposite side of the body portion including a slotted socket opening for receiving the ball end of a trailer tongue fastener. The tongue fastener is retained in position by means of a pin passing through the opposing walls of the slot.

13 Claims, 6 Drawing Sheets

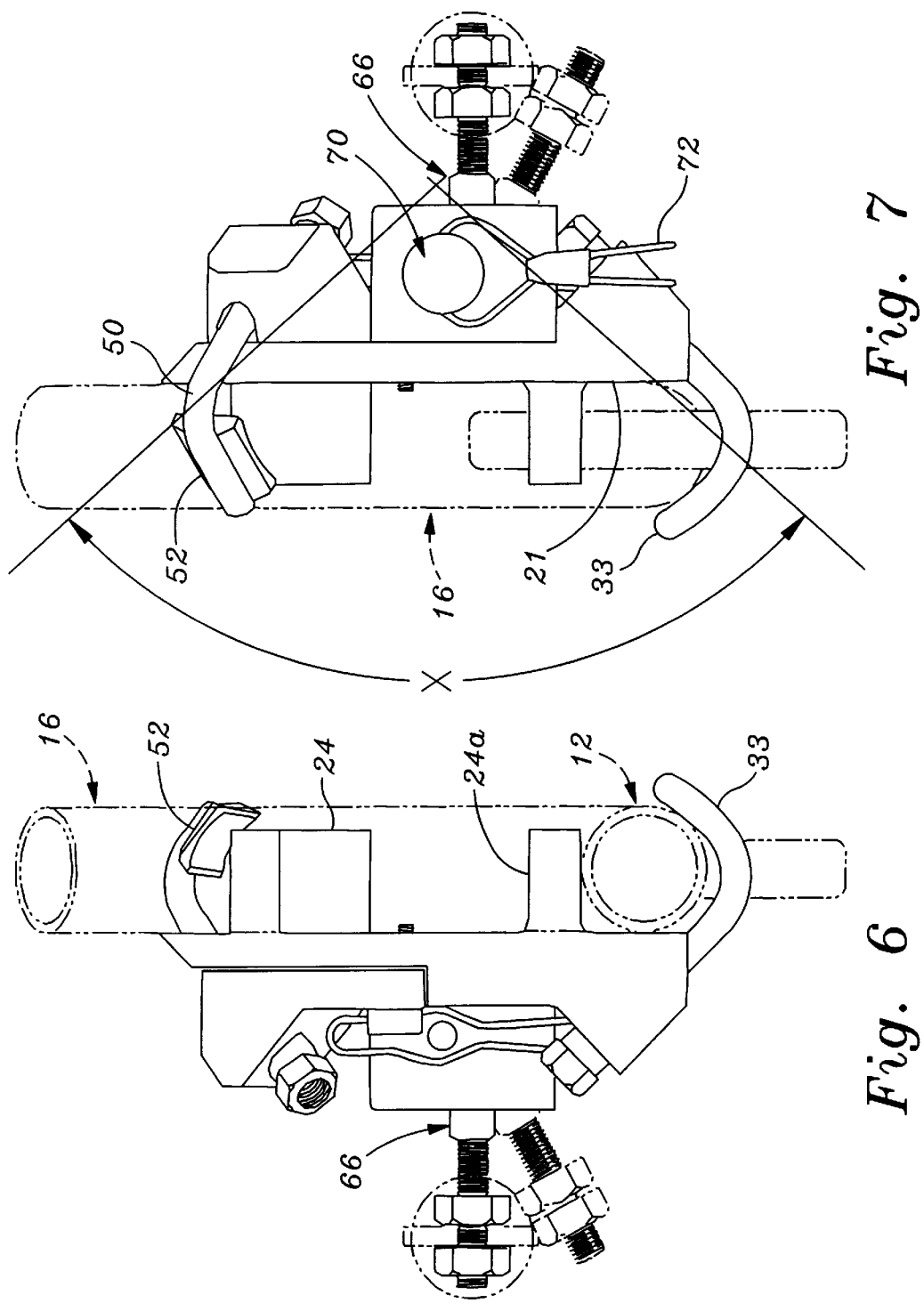

BICYCLE TRAILER HITCH ASSEMBLY

BACKGROUND OF THE INVENTION

The background of the invention will be discussed in two parts.

1. Field of the Invention

This invention relates to accessories for bicycles, and more particularly to a trailer hitch assembly for use with a bicycle for towing a trailer.

2. Description of the Prior Art

Bicycling has become a standard method of exercise, as well as a method of transportation. As part of the use of bicycles for families, there has been a trend toward the use of trailers for bicycles, such trailers being predominantly intended for transportation of pre-school children. Trailer hitches have been designed for bicycles for towing such trailers. Many of such trailer hitches are configured for attachment to the frame of the bicycle at one side of the bicycle adjacent the axle of the rear wheel.

One of the problems associated with bicycle trailer towing relates to the bicycle frame itself. Bicycle frames are not constructed alike, that is, they are not only of different sizes, but even for a given size, widths at the rear wheel may vary, along with variations in the angles at the "crotch" of the bicycle which is the angle formed adjacent the rear wheel between the seat stay and the chain stay. Furthermore, tube dimensions and cross-sectional shapes for the chain and seat stays may vary from one manufacturer to another. Bicycle hitches are normally attached at or adjacent the crotch, and a given hitch may fit only a limited number of bicycle frames due to these variances in widths and angles.

One type of trailer hitch is shown and described in U.S. Pat. No. 4,721,320, entitled "Bicycle Trailer Hitch", issued to Creps et al., on Jan. 26, 1988. The Creps trailer hitch is configured for attachment to one side of the frame at the crotch▼ portion of the rear part of the frame of the bicycle, that is, at the junction of the seat stay and chain stay members of the bicycle frame. As shown in the drawings of the patent, the trailer hitch is on the left side of the frame, as a consequence of which, right hand turns of the bicycle are impeded with the trailer attached.

In accordance with an aspect of the invention, there is provided a bicycle trailer hitch assembly which is primarily configured for enabling center pulling of a towed trailer.

SUMMARY OF THE INVENTION

In accordance with the invention there is provided a bicycle trailer hitch assembly including first and second hitch members configured as mirror images of one another, the hitch members being adapted and arranged for attachment to opposites sides of the bicycle frame adjacent the rear wheel. Each member includes a body portion having a first projection configured for abutting relation with the chain stay of the bicycle and a second arcuately configured projection for tangentially abutting relation with the seat stay, each of the projections having a fastener arrangement coacting with the body portion and the adjacent stay of the bicycle frame for enabling securing the hitch member to the frame, while at the same time providing for chain clearance.

Both projections extend from the same side of the body portion with the opposite side of the body portion including a slotted socket opening for receiving the ball end of a trailer tongue fastener. The tongue fastener is retained in position by means of a pin passing through the opposing walls of the slot.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 6 is a front end view of the hitch member of FIG. 1; and

FIG. 7 is a rear end view of the hitch member of FIG. 1.

DESCRIPTION OF THE PREFERRED EMBODIMENT

Figure 1:
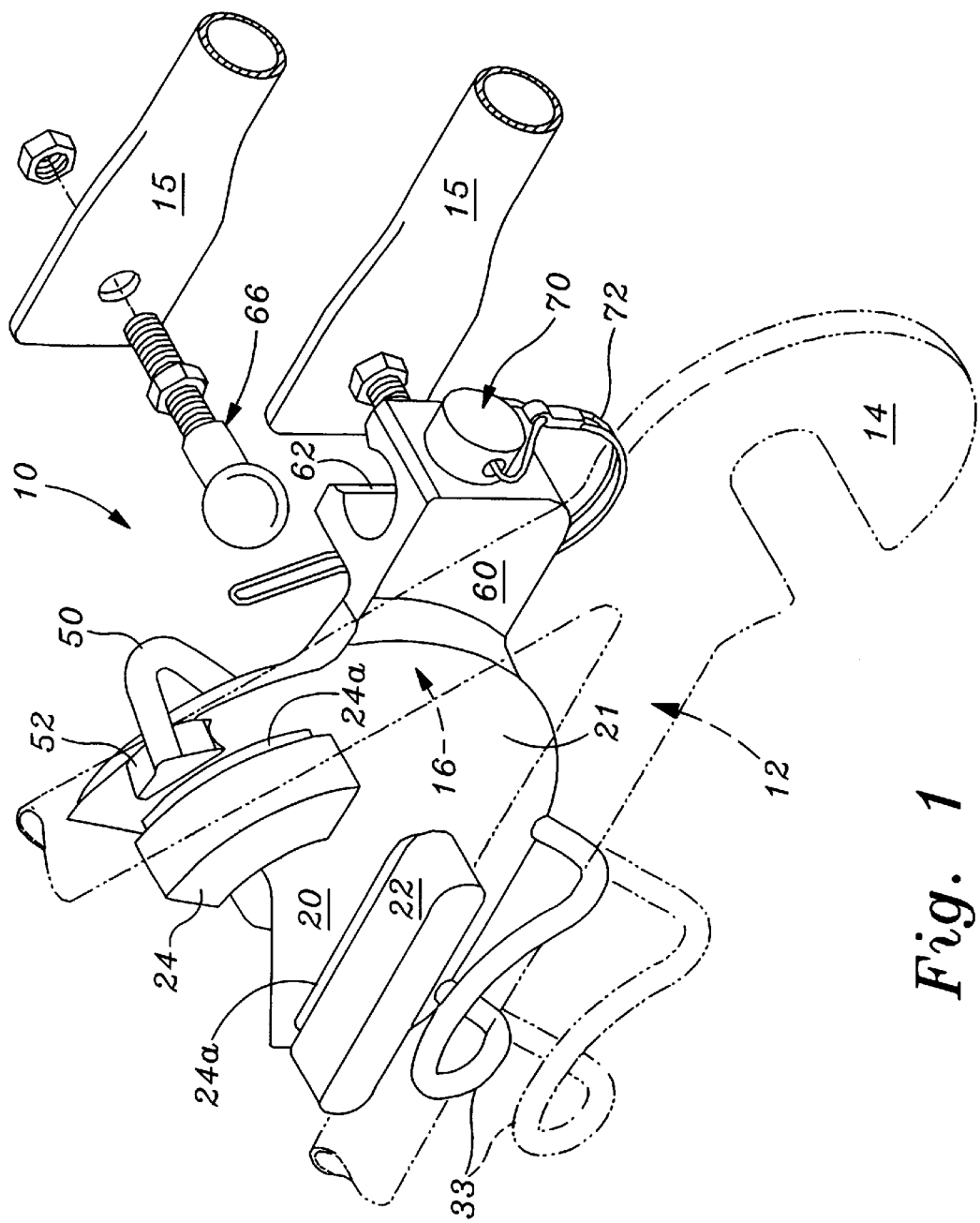
FIG. 1 is a perspective view of one hitch member of the trailer hitch assembly according to the invention, with the trailer tongue connection duplicated and shown in exploded relation.
Figure 2:
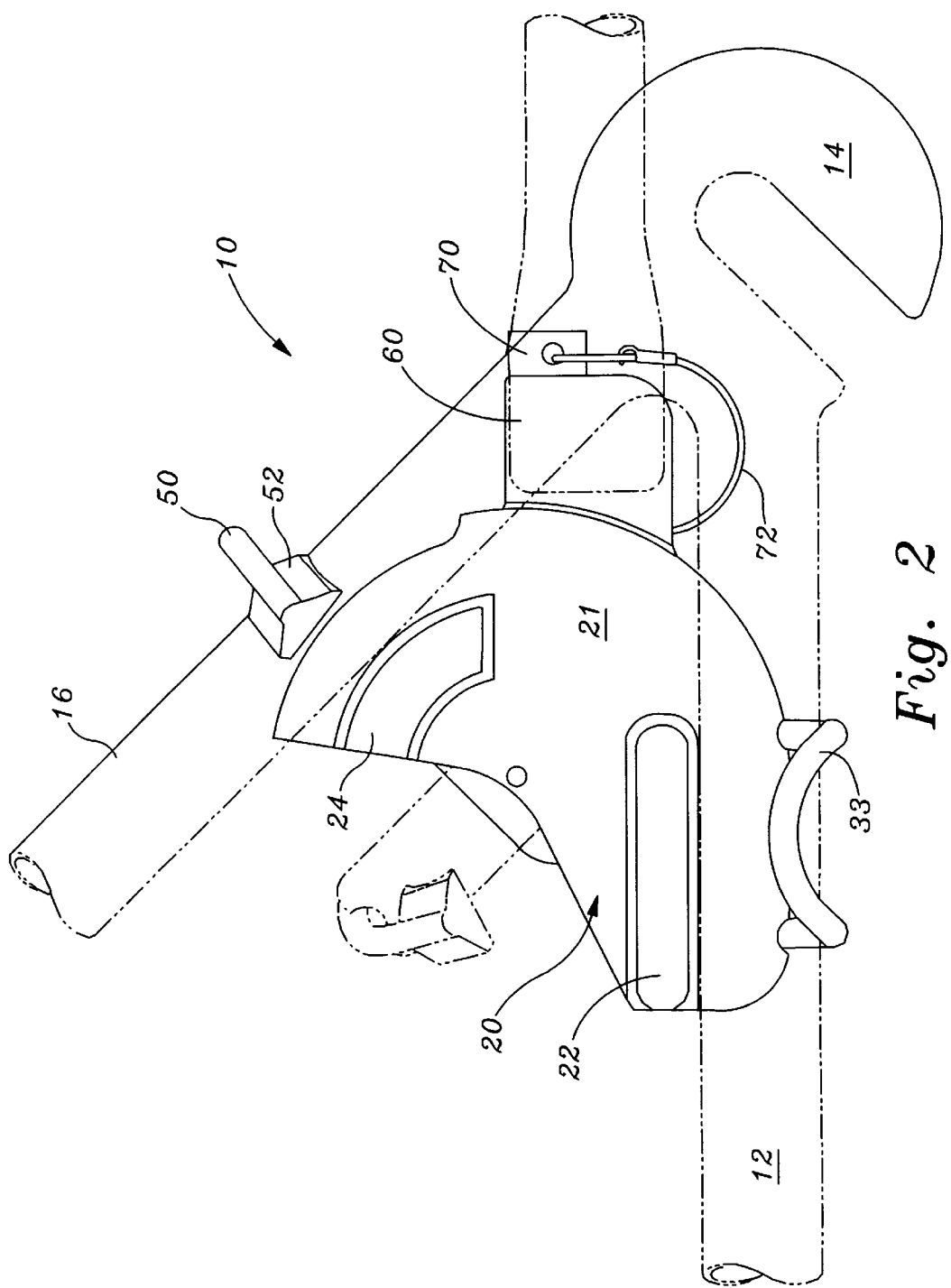
FIG. 2 is an inside side elevational view of the hitch member of FIG. 1.

Referring now to the drawings, and particularly to FIG. 1, there is shown a trailer hitch member, generally designated 10, attached to the rear portion of the frame of a bicycle.

In accordance with the invention, the trailer hitch assembly includes a first hitch member 10 and a generally identically configured and dimensioned second hitch member (not shown) which is virtually a mirror image replica of the first hitch member 10. The two hitch members are configured and dimensioned for attachment to opposing sides of the rear of a bicycle frame and, in conjunction with a two part trailer tongue (one part of which is shown in FIG. 1 with the reference numeral 15), the trailer is then towed in what might be referred to as a "center pull" manner, as opposed to some prior art bicycle trailer hitches which normally attach to only one side of the frame.

The bicycle is not shown in detail and only certain structural members of the bicycle are depicted in broken lines, these being only those members which are necessary to an understanding of the invention. The rear part of the frame of the bicycle includes a chain stay 12 which is the lower frame member which is disposed generally parallel to the ground, a rear wheel drop out member 14 and a seat stay 16. The seat stay 16 extends downwards at an angle from the bicycle seat (not shown) to the rear wheel drop out member 14, which serves to interconnect the chain stay 12 and the seat stay 16. The angle between the chain stay and seat stay is not necessarily the same on all bicycle frames and, as will be described, the hitch member 10 (and its corresponding opposite member) is configured and dimensioned for attachment to the frame regardless of the angle.

The hitch member 10 has a main body portion 20 which, on the inside, has a broad bearing surface 21 with first and second projections 22, 24 extending from the surface 21 thereof at positions inwards from the outer periphery of the body portion 20. In side elevation, the projection 22 is an elongate generally rectangular or bar-shaped member, while the projection 24 is formed as an arc segment.

The periphery of the bearing surface 21 of the body portion 20 is dimensioned so that, on attachment of hitch 10 at the crotch area, this surface 21 abuts against the sides of the chain stay 12 and seat stay 16. The lower surface of projection 22 is configured for closely abutting the top edge of chain stay 12 over the length of the projection 22, with the adjacent surface of the body portion 20 abutting the chain stay 12 at the side, that is, at a position ninety degrees from the point of contact of projection 22.

Simultaneously, the arcuate upper surface of projection 24 is configured for tangential abutting engagement with the underside of seat stay 16, with the adjacent surface of the body portion 20 abutting the outer surface of seat stay 16 at a position ninety degrees from the point of contact of projection 24. By use of this arrangement the lines of fastening force urge the bearing surface 21 towards the side of the two stays, while simultaneously urging the respective projection towards the inner abutting surface of the respective stay.

Figure 3:
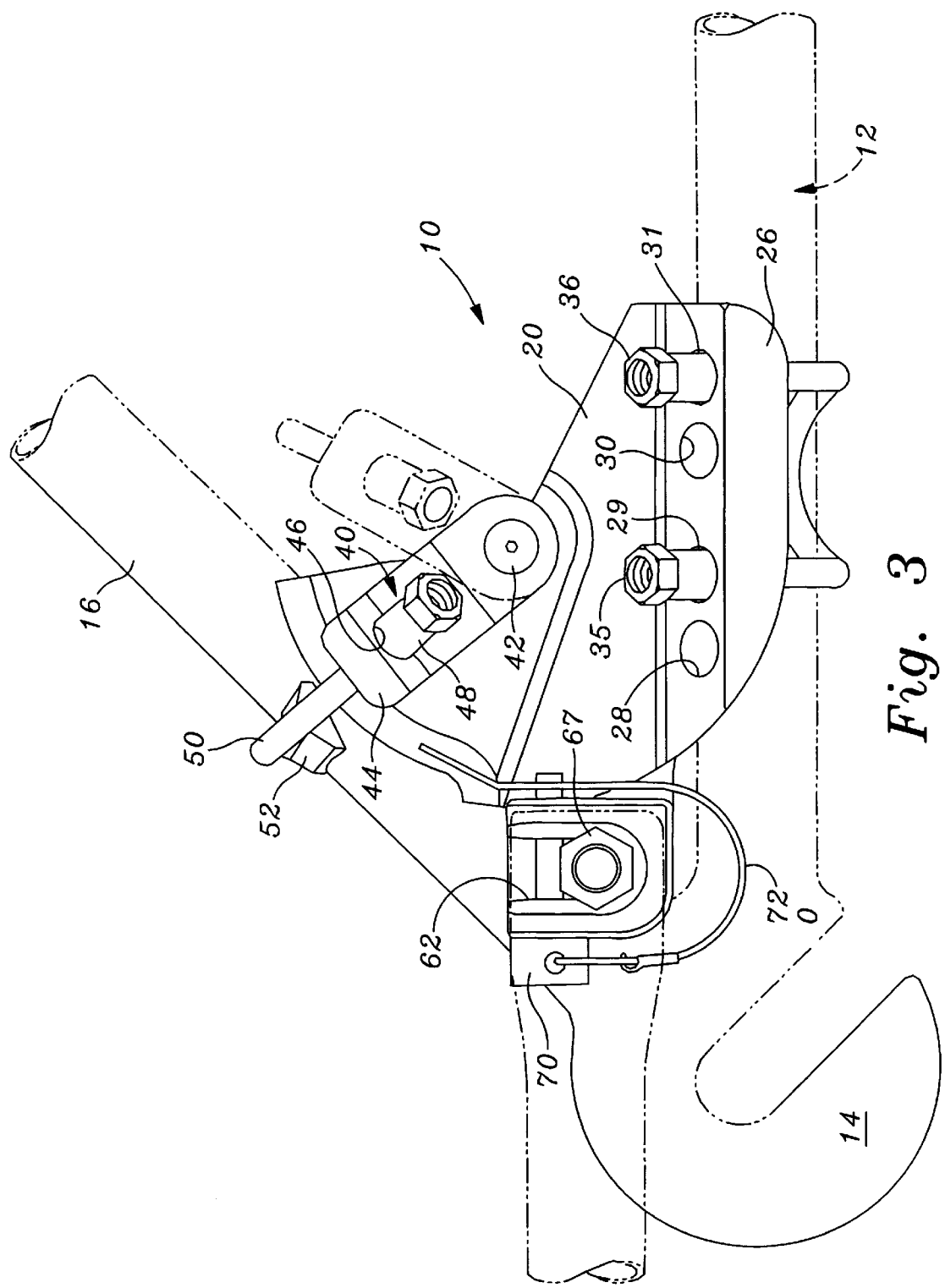
FIG. 3 is an outside side elevational view of the hitch member of the bicycle trailer hitch assembly of FIG. 1.

The surface of body portion 20 opposite the bearing surface 21 faces towards the outside of the frame and, as illustrated in FIG. 3, includes first and second fastening means for coacting with the chain stay 12 and seat stay 16 for securing the hitch member 10 to the frame members 12 and 16. As will be described, each of these fastening means is oriented at an angle of forty-five degrees relative to the plane of the bearing surface 20, in opposing directions such that the hitch member 10 will not twist or slide on the frame. (Refer to FIG. 7 wherein angle "X" is ninety degrees.)

The lower edge of body portion 20 is formed as an angularly oriented ledge 26 with a plurality of generally equally spaced apertures 28–31 extending therethrough, the angle of orientation being such that the axes of apertures 28–31 are downwards and inwards toward the chain stay 12, this angle being about forty-five degrees relative to the plane of the bearing surface 21.

A generally U-shaped bolt member 33 has the bight portion thereof bent to form a J-shape in end elevation to form a lower hook end. The two free threaded ends of bolt member 33 extend upwards though a pair of spaced apertures 29, 31 (or 28, 30), with barrel nuts 35, 36 being threaded thereon, the nuts 35, 36 having the nuts integrally formed with a tubular portion which fits within the aperture, the nut ends being larger in dimension with a shoulder which abuts against the ledge 26 in the vicinity of the apertures. In this manner, the threaded ends of the bolt member 33 are shrouded by the nuts 35, 36 leaving no exposed threads.

During fastening, the lower J-shaped end of the bolt 33 is positioned below the chain stay 12 and, as the nuts 35, 36 are tightened, the bight portion of bolt 33 grasps the underside of the chain stay 12 urging the projection 22 downwards in intimate abutting relation with the upper edge of chain stay 12 while simultaneously urging the bearing surface of the main body portion 20 into intimate engaging contact with the side edge of chain stay 12. By use of the J-shaped U-bolt, this prevents the hitch clamp 10 from turning while tightening and also spreads the load over a wider area than the use of a hook fastener.

Second fastening means are provided for securing the upper end of hitch 10 to the seat stay 16, the fastening means including an arm, generally designated 40, pivotally attached (with a hex bolt 42 for pivoting between the solid line position and the broken line position) at the lower end to the outer surface of the body portion 20 at the center of the radius of the arc of the arc segment projection 24. The upper end of arm 40 has an outwardly canted portion 44 with an aperture 46 extending there-through in alignment with the longitudinal center line of the arm 40, the axis of aperture 46 forming an angle of forty-five degrees relative to the plane of the bearing surface 21.

A generally L-shaped hook member 50 has a threaded end passing through the aperture 46 and receiving a barrel nut 48. The upper end of hook 50 is provided with a pad 52 having a contoured surface for matingly abutting the surface of the seat stay 16. The angle between the chain stay 12 and seat stay 16 will determine the point of tangential abutting of the arcuate projection 24 with the underside of the seat stay 16 and, for securing the upper part of hitch member 10, the arm 40 will be in alignment with this point of tangential abutting, and, upon tightening of the barrel nut 48, the pad 52 will urge the body portion 20 into abutment with the side of the seat stay 16 and urge the projection 24 into contact with the tangent point on the underside of seat stay 16.

By reference to FIG. 1, the clamp 10 includes provision for any cables which may be secured to the chain stay 12 or seat stay 16, usually the latter. The projection 24 is provided with a cable relief groove 24a, and similarly the projection 22 is provided with a cable relief groove 22a. Normally the derailleur control cable is affixed to the seat stay on the right side of the bicycle frame.

Flexibility of attachment to a large number of bicycle frames is obtained by the hitch member 10 as a result of the projection 22 abutting the chain stay with the pivotable aspect of arm 40 and the point contact of the arcuate projection 24 providing adjustability. For secure attachment to the frame. The first and second fastening means are in opposing relationship, that is, the first fastening means, the J-shaped U-member 33 is oriented from the outside of the chain stay upwardly at an angle of 45 degrees, while the second fastening means, the J-hook 50 is oriented from the outside of the chain stay downwardly at an angle of 45 degrees, both thus urging the bearing surface 21 into engagement with the side edges of the respective stays.

Figure 4:
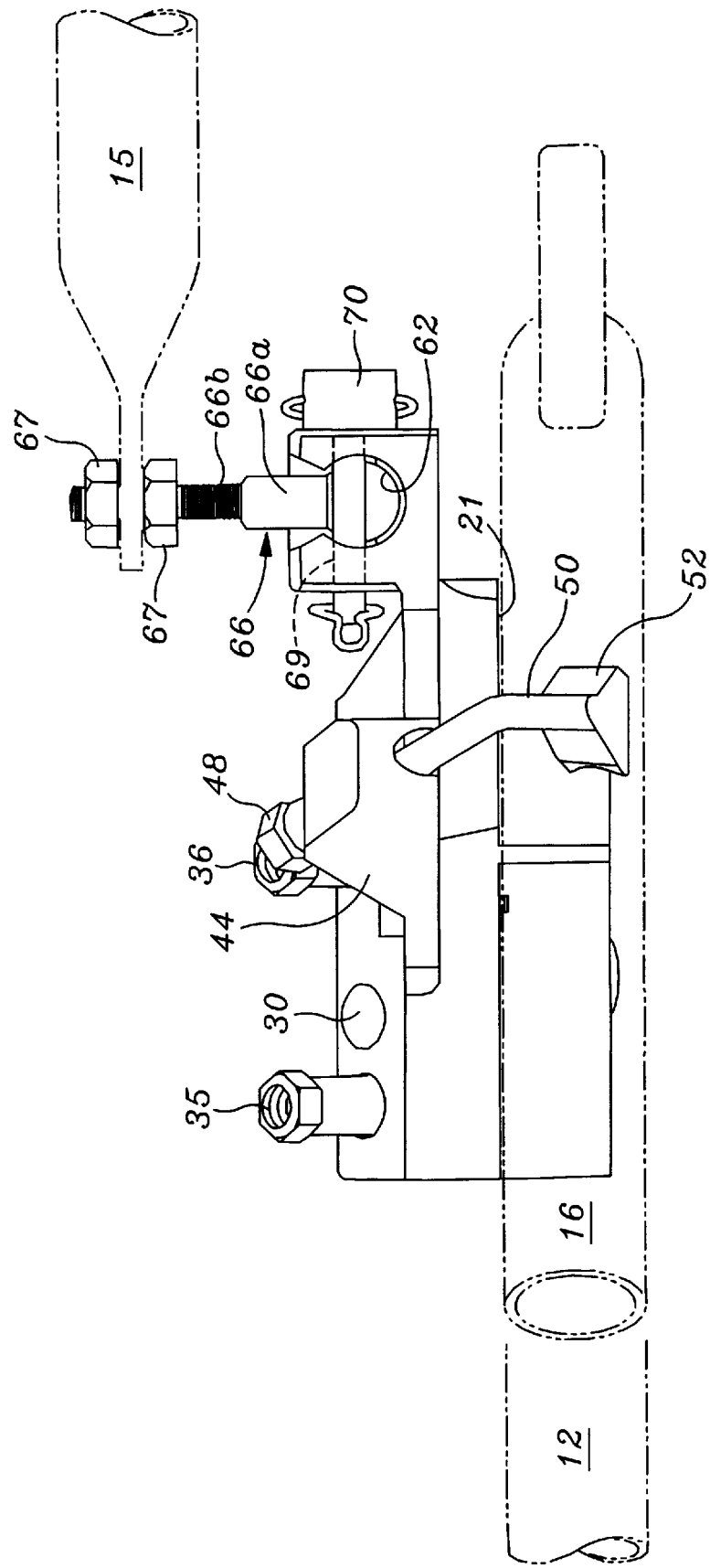
FIG. 4 is a top plan view of the hitch member of FIG. 1.
Figure 5:
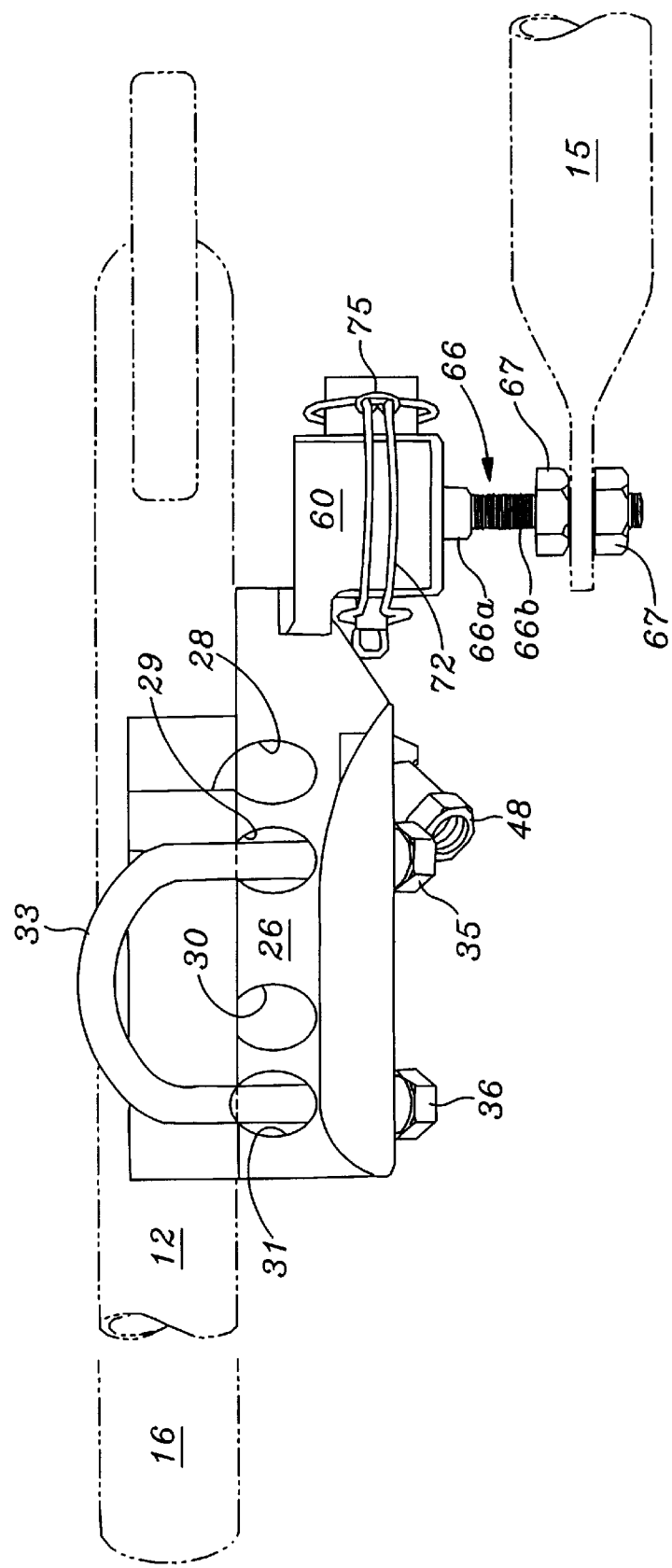
FIG. 5 is a bottom plan view of the hitch member invention of FIG. 1.

Attachment of tongue 15 of the trailer to the trailer hitch member 10 is accomplished by means of a rearwardly facing extension 60 integrally formed with the body portion 20. The extension 60 is generally cubically configured with a slotted socket 62 (See FIGS. 1, 3 and 4) the slot being open at the upper end. As best shown in FIG. 4, in cross-section, the socket is generally spherically shaped with an outer wedge shaped opening which permits angular motion of the ball end of tongue hitch ball 66 through an angle such as depicted in FIGS. 6 and 7.

The hitch ball 66 includes a ball end 66a, a threaded shaft 66b and a pair of nut members 67. The ball end 66a includes a sleeve extension with a threaded aperture therein for receiving the threaded shaft 66b. The pair of nuts 67 are threaded on the shaft 66b, one on each side of trailer tongue 15 when assembled thereon.

By suitable adjustment of the nuts 67 relative to the shaft 66b and adjustment of the shaft 66b within the sleeve of ball end 66a, dimensional variations in width between stays at the rear of a bicycle frame can be accommodated. For relative movement of the ball end 66a within the socket, the wedge shape along with the slot essentially provide for a broad range of movement of the hitch ball 66. To retain the hitch ball 66 within the socket 62, the extension 60 is provided with an aperture 69 traversing the slotted socket 62 for receiving a pin fastener 70 of the type which has an enlarged head portion with a U-shaped spring clamp 72 hingedly coupled thereto, the free end of the spring clamp 72 having an opening for attachment to the end of the shaft of the pin 72.

In accordance with the invention, there has been shown and described a bicycle trailer hitch assembly of compact and efficient construction with provision for attachment to prevent twisting and sliding during use, as well as providing fasteners which permit chain clearance, the hitch being positioned on the frame at a location where it will not interfere with the heels of the cycler.

While the description has utilized directional references, such as inner, outer, up, upper, under, down, right, left, clockwise, etc., it is to be understood that these terms are utilized with reference to the orientations in the figures and are not intended to be limiting. While there has been shown and described a preferred embodiment, other adaptations and modifications may be made without departing from the spirit and scope of the invention.

What is claimed is:

1. A bicycle trailer hitch for attachment to the frame of a bicycle adjacent the rear wheel of said bicycle at the junction of the seat stay and chain stay of said bicycle, said hitch comprising:

a body portion having a generally planar bearing surface;

a first projection on said bearing surface configured for abutting relation with said chain stay of said bicycle;

a second projection on said bearing surface for abutting relation with said seat stay;

a first fastener arrangement coacting with the body portion adjacent said first projection for engaging said chain stay of said bicycle frame;

a second fastener arrangement coacting with the body portion adjacent said second projection for engaging said seat stay of said bicycle frame; and socket means formed within a portion of said body portion opposite said bearing surface and a hitch ball member having a ball end for mating coaction with said socket means or enabling attachment of said hitch ball member to the tongue of a bicycle trailer.

2. The hitch according to claim 1 wherein said first and second fastener arrangements include hook means for engaging said chain and seat stays, respectively, said hook means being oriented to simultaneously urge the bearing surface towards the side of said stays and the associated projection towards its associated abutting surface.

3. The hitch according to claim 1 wherein said first and second projections are integrally formed with said bearing surface and are disposed at a right angle relative thereto.

4. The hitch according to claim 3 wherein said first fastener arrangement includes first hook means for engaging said chain stay along a force line at an angle about forty-five degrees relative to said bearing surface and said second fastener arrangement includes second hook means for engaging said seat stay along a force line at an angle about forty-five degrees relative to said bearing surface.

5. A bicycle trailer hitch for attachment to the frame of a bicycle adjacent the rear wheel of said bicycle at the junction of the seat star and chain stay of said bicycle, said hitch comprising:

a body portion having a generally planar bearing surface;

a first projection on said bearing surface configured for abutting relation with said chain stay of said bicycle;

an arcuately configured second projection on said bearing surface for abutting relation with said seat stay;

a first fastener arrangement coacting with the body portion adjacent said first projection for engaging said chain stay of said bicycle frame;

a second fastener arrangement coacting with the body portion adjacent said second projection for engaging said seat stay of said bicycle frame, said second fastener arrangement including a pivotable arm having hook means thereon for enabling adjustment of a force line to a direction along a radius of a point of contact of said second projection with said seat stay; and means for enabling connection of said body portion to a tongue of the bicycle trailer.

6. A trailer hitch for attachment to the frame of a bicycle adjacent the rear wheel of said bicycle at the junction of the seat stay and chain stay of said bicycle, said hitch comprising:

a body having a generally planar bearing surface;

a first elongate projection formed on said body generally perpendicular to said bearing surface and configured for abutting relation with a segment of said chain stay of said bicycle;

a second arcuately configured projection formed on said body generally perpendicular to said bearing surface for abutting relation with said seat stay at a point;

a first fastener arrangement coacting with the body portion adjacent said first projection for engaging said chain stay of said bicycle frame for urging said first projection into abutting engagement with said chain stay while simultaneously urging said bearing surface into abutment with the side of said chain stay;

a second fastener arrangement coacting with the body portion adjacent said second projection for urging said second projection into abutting engagement with said seat stay while simultaneously urging said bearing surface into abutment with the side of said seat stay; and socket means formed within a portion of said body opposite said bearing surface and a hitch ball member having a ball end for mating coaction with said socket means for enabling attachment of said hitch ball member to the tongue of a bicycle trailer.

7. The hitch according to claim 6 wherein said first fastener arrangement includes first hook means for engaging said chain stay along a force line at an angle about forty-five degrees relative to said bearing surface and said second fastener arrangement includes second hook means for engaging said seat stay along a force line at an angle about forty-five degrees relative to said bearing surface.

8. A bicycle trailer hitch assembly for attachment to opposites sides of the frame of a bicycle adjacent the rear wheel of said bicycle at the junction of the seat stay and chain stay of said bicycle, said assembly comprising:

first and second hitch members configured as generally identical mirror images of one another, each member including a body portion having a bearing surface with a first projection configured for abutting relation with said chain stay of the bicycle and a second projection for abutting relation with said seat stay;

a first fastener arrangement on each hitch member coacting with said body portion adjacent said first projection for engaging said chain stay of said bicycle frame;

a second fastener arrangement on each hitch member coacting with the body portion adjacent said second projection for engaging said seat stay of said bicycle frame;

means for enabling connection of said body portion to a tongue of a bicycle trailer.

9. The hitch according to claim 8 wherein said means for enabling connection includes socket means formed within a portion of said body portion of each of said hitch members opposite said bearing surface and a hitch ball member having a ball end for mating coaction with said socket means for enabling attachment of said hitch ball member to said tongue of a trailer.

10. The hitch according to claim 8 wherein said first and second fastener arrangements include hook means for engaging said chain and seat stays, respectively, said hook means being oriented to simultaneously urge the bearing surface towards the side of said stays and the associated projection towards its associated abutting surface.

11. The hitch according to claim 8 wherein said first and second projections are integrally formed with said bearing surface and are disposed at a right angle relative thereto.

12. The hitch according to claim 11 wherein said first fastener arrangement includes first hook means for engaging said chain stay along a force line at an angle about forty-five degrees relative to said bearing surface and said second fastener arrangement includes second hook means for engaging said seat stay along a force line at an angle about forty-five degrees relative to said bearing surface.

13. The hitch according to claim 8 wherein said second projection is arcuately configured and said second fastener arrangement includes a pivotable arm having hook means thereon for enabling adjustment of a force line to a direction along a radius of a point of contact of said second projection with said seat stay.

* * * * *